US010539426B2

(12) United States Patent
Bouaziz et al.

(10) Patent No.: US 10,539,426 B2
(45) Date of Patent: Jan. 21, 2020

(54) DEVICE ASSOCIATED WITH A VEHICLE AND HAVING A SPELLING SYSTEM WITH A COMPLETION INDICATION

(71) Applicant: AUDI AG, Ingolstadt (DE)

(72) Inventors: Tahar Bouaziz, Ingolstadt (DE); Michael Betz, Ingolstadt (DE); Emanuel Angelescu, Ingolstadt (DE); Carolin Köberle, Ingolstadt (DE); Jürgen Steinle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 49 days.

(21) Appl. No.: 14/775,396

(22) PCT Filed: Mar. 6, 2014

(86) PCT No.: PCT/EP2014/000579
§ 371 (c)(1),
(2) Date: Sep. 11, 2015

(87) PCT Pub. No.: WO2014/139650
PCT Pub. Date: Sep. 18, 2014

(65) Prior Publication Data
US 2016/0025511 A1 Jan. 28, 2016

(30) Foreign Application Priority Data
Mar. 12, 2013 (DE) .................. 10 2013 004 246

(51) Int. Cl.
G01C 21/36 (2006.01)
G06F 3/023 (2006.01)
(52) U.S. Cl.
CPC ........ G01C 21/3611 (2013.01); G06F 3/0236 (2013.01); G06F 3/0237 (2013.01)
(58) Field of Classification Search
CPC .. G01C 21/3611; G06F 3/0236; G06F 3/0237
See application file for complete search history.

(56) References Cited

U.S. PATENT DOCUMENTS 5,784,060 A * 7/1998 Bertram ............ G06F 3/04886
345/169
6,002,390 A * 12/1999 Masui ................ G06F 3/04886
340/4.1
(Continued)

FOREIGN PATENT DOCUMENTS

CN 1953082 4/2007
CN 101163944 4/2008
(Continued)

OTHER PUBLICATIONS

Office Action for Chinese Patent Application No. 201480003167.1 dated Oct. 9, 2016, 5 pages.
(Continued)

Primary Examiner — Ajay M Bhatia
Assistant Examiner — Phoebe X Pan
(74) Attorney, Agent, or Firm — Alston & Bird LLP

(57) ABSTRACT

The present invention relates to a vehicle-associated device with an operating unit by means of which at least alphanumerical characters and/or symbols can be selected and assembled to form a character or function group, and with a display device by means of which, using a display unit 1, selectable characters and/or symbols can be displayed in at least one selection field 2, and selected characters, symbols, a character or function group can be displayed in at least one input field 3, with a storage device with data stored therein, and with a data processing unit for selecting data from data stored in the storage device, on the basis of predeterminable criteria and taking into consideration the characters and/or symbols selected so far by a user, wherein the device is set up in order to display, on the display unit 1, a completion designation 4 in the area of the selection field 2 in the immediate vicinity of a character or symbol selected most recently by a user, to the extent that a possible completion of the character(s) and/or symbol(s) selected so far is deter- (Continued)

Figure 1:
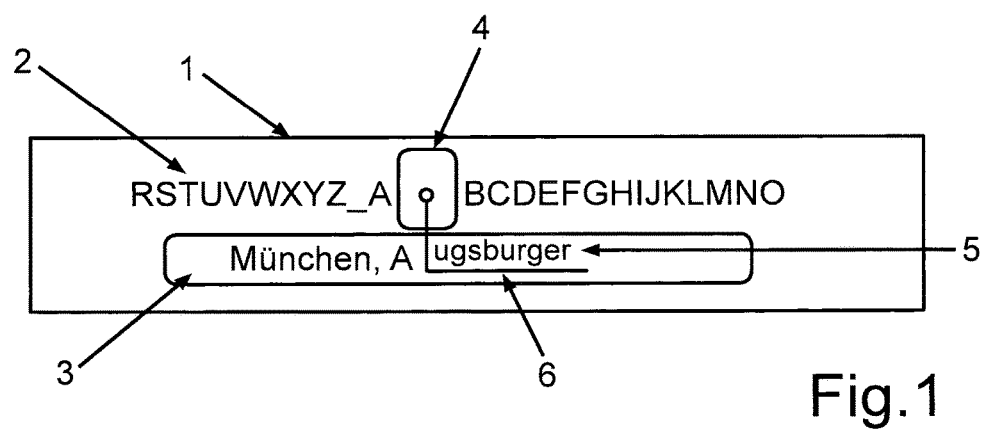

mined by the data processing unit on the basis of the data in the storage device and taking into consideration the character(s) and/or symbol(s) selected by a user so far, the completion designation 4 can be selected by a user using the operating unit or a selection designation can be positioned automatically on the completion designation 4, and a displayed completion suggestion can be selected by a user using the operating unit.

11 Claims, 1 Drawing Sheet

(56) References Cited

U.S. PATENT DOCUMENTS

| | | | | |
|---|---|---|---|---|
| 6,011,542 | A * | 1/2000 | Durrani | G06F 3/0236 345/156 |
| 6,094,197 | A * | 7/2000 | Buxton | G06F 3/0482 341/22 |
| 6,144,378 | A * | 11/2000 | Lee | G06F 3/0236 715/767 |
| 6,744,427 | B2 | 6/2004 | Maglio | G06F 3/0233 341/22 |
| 6,809,725 | B1 * | 10/2004 | Zhang | G06F 3/018 345/171 |
| 7,385,592 | B2 * | 6/2008 | Collins | G06F 3/0482 345/173 |
| 7,574,672 | B2 * | 8/2009 | Jobs | G06F 3/0236 345/156 |
| 8,190,989 | B1 * | 5/2012 | Singh | G06F 17/243 715/224 |
| 8,223,127 | B2 * | 7/2012 | Park | G06F 3/0481 345/156 |
| 8,490,008 | B2 * | 7/2013 | Griffin | G06F 3/0237 345/173 |
| 8,495,732 | B2 * | 7/2013 | Guenthner | G06F 21/34 713/183 |
| D701,523 | S * | 3/2014 | Kim | D14/486 |
| 9,032,322 | B2 * | 5/2015 | Griffin | G06F 3/0237 345/173 |
| 9,120,381 | B2 * | 9/2015 | Genesin | B60K 37/06 |
| 9,134,881 | B2 * | 9/2015 | Wheeler | G06F 3/0482 |
| 9,318,108 | B2 * | 4/2016 | Gruber | G10L 15/1815 |
| 9,354,715 | B2 * | 5/2016 | Carlson | G06F 3/0237 |
| 9,740,297 | B2 * | 8/2017 | Karakotsios | G06F 3/017 |
| 9,880,638 | B2 * | 1/2018 | Murphy | G06F 3/0236 |
| 2001/0020212 | A1 * | 9/2001 | Urban | G01C 21/3611 701/538 |
| 2002/0152080 | A1 | 10/2002 | Ehrke | |
| 2003/0114202 | A1 | 6/2003 | Suh et al. | |
| 2004/0030493 | A1 | 2/2004 | Pechatnikov et al. | |
| 2004/0070567 | A1 * | 4/2004 | Longe | G06F 3/0236 345/156 |
| 2005/0275632 | A1 * | 12/2005 | Pu | G01C 21/3611 345/171 |
| 2006/0053387 | A1 * | 3/2006 | Ording | G06F 3/04883 715/773 |
| 2006/0176283 | A1 * | 8/2006 | Suraqui | G06F 3/0237 345/169 |
| 2006/0196925 | A1 * | 9/2006 | Dong | H04M 1/7258 235/375 |
| 2006/0224945 | A1 | 10/2006 | Khan et al. | |
| 2007/0003214 | A1 | 1/2007 | Toyoda et al. | |
| 2007/0097085 | A1 * | 5/2007 | Iwatsuki | G06F 3/04886 345/173 |
| 2007/0205625 | A1 | 9/2007 | Lai et al. | |
| 2008/0066135 | A1 * | 3/2008 | Brodersen | G06F 3/0236 725/134 |
| 2008/0259184 | A1 * | 10/2008 | Shingu | G06K 9/22 348/231.99 |
| 2008/0284782 | A1 * | 11/2008 | Englerth | G06F 3/0236 345/468 |
| 2009/0006543 | A1 | 1/2009 | Smit | |
| 2009/0019002 | A1 * | 1/2009 | Boulis | G06F 17/30867 |
| 2009/0027337 | A1 | 1/2009 | Hildreth | |
| 2009/0079813 | A1 | 3/2009 | Hildreth | |
| 2009/0315740 | A1 | 12/2009 | Hildreth et al. | |
| 2009/0326794 | A1 * | 12/2009 | Lungwitz | G01C 21/3611 701/532 |
| 2010/0070908 | A1 * | 3/2010 | Mori | G06F 3/0237 715/773 |
| 2010/0225599 | A1 * | 9/2010 | Danielsson | G06F 3/0237 345/173 |
| 2010/0241627 | A1 * | 9/2010 | Kondo | G01C 21/3611 707/737 |
| 2010/0271458 | A1 * | 10/2010 | Shethia | H04N 5/66 348/14.08 |
| 2011/0304649 | A1 | 12/2011 | Schwesinger et al. | |
| 2012/0034954 | A1 | 2/2012 | Tabe | |
| 2012/0062465 | A1 * | 3/2012 | Spetalnick | G06F 3/0236 345/168 |
| 2012/0109994 | A1 | 5/2012 | Ju et al. | |
| 2012/0166464 | A1 | 6/2012 | Honkola et al. | |
| 2012/0169613 | A1 | 7/2012 | Armstrong et al. | |
| 2012/0206367 | A1 * | 8/2012 | Griffin | G06F 3/0237 345/169 |
| 2012/0245945 | A1 | 9/2012 | Miyauchi et al. | |
| 2013/0120267 | A1 * | 5/2013 | Pasquero | G06F 17/276 345/168 |
| 2013/0169540 | A1 * | 7/2013 | Dinh | G06F 3/04886 345/168 |
| 2013/0246329 | A1 * | 9/2013 | Pasquero | G06F 17/276 706/52 |
| 2013/0342460 | A1 | 12/2013 | Vincent et al. | |
| 2014/0108004 | A1 | 4/2014 | Sternby et al. | |
| 2014/0250405 | A1 * | 9/2014 | Wheeler | G06F 3/0482 715/780 |
| 2014/0363074 | A1 | 12/2014 | Dolfing et al. | |
| 2015/0029090 | A1 * | 1/2015 | Kim | G06F 3/017 345/156 |
| 2015/0040055 | A1 * | 2/2015 | Zhao | G06F 3/04886 715/773 |
| 2015/0294145 | A1 | 10/2015 | Bouaziz et al. | |
| 2016/0062566 | A1 | 3/2016 | Bouaziz et al. | |
| 2016/0070441 | A1 * | 3/2016 | Paek | G06F 3/04842 715/773 |
| 2016/0132233 | A1 * | 5/2016 | Ghassabian | G06F 3/0237 715/773 |
| 2016/0139796 | A1 | 5/2016 | Bouaziz et al. | |

FOREIGN PATENT DOCUMENTS

| | | |
|---|---|---|
| CN | 101164325 | 4/2008 |
| CN | 101194256 A | 6/2008 |
| CN | 101681198 A | 3/2010 |
| CN | 101855634 | 10/2010 |
| CN | 102939574 | 2/2013 |
| DE | 198 54 116 | 6/2000 |
| DE | 1 081 582 A1 | 3/2001 |
| DE | 199 41 949 | 3/2001 |
| DE | 10 025 042 | 1/2002 |
| DE | 10 2005 029 781 | 9/2006 |
| DE | 10 2005 062 465 | 7/2007 |
| DE | 103 28 200 | 8/2007 |
| DE | 10 2007 023313 | 11/2008 |
| DE | 10 2007 052 613 | 5/2009 |
| DE | 10 2009 021124 | 9/2010 |
| DE | 10 2009 060365 | 3/2012 |
| EP | 1 081 582 | 3/2001 |
| EP | 1 120 633 | 8/2001 |
| EP | 1 120 633 A2 | 8/2001 |
| EP | 1 296 216 | 3/2003 |
| EP | 1 359 393 A2 | 11/2003 |
| EP | 1 455 163 | 9/2004 |
| EP | 1 548 551 | 6/2005 |
| EP | 2 075 547 | 7/2009 |

(56) References Cited

OTHER PUBLICATIONS

International Search Report for International Application PCT/EP2014/000579 dated May 20, 2014.
Examination Report for German Application No. 10 2013 004 246.1 dated Oct. 23, 2015.
Written Oninion for Application No. 1 PCT/EP2014/000579 (undated).
International Preliminary Report on Patentability (Chapter II) for Application No. PCT/EP2014/000579 dated Feb. 17, 2015.
International Preliminary Report on Patentability (Chapter II) for Application No. PCT/EP2014/000579 dated Sep. 17, 2015.
International Search Report for International Application PCT/EP2014/000577 dated Jun. 2, 2014.
Office Action for Chinese Application No. 201480003168.6 dated Nov. 2, 2016.
Written Opinion for International Application No. PCT/EP2014/000577 dated Nov. 2, 2016.
Office Action for Chinese Application No. 201480003168.6 dated Mar. 1, 2017.

* cited by examiner

DEVICE ASSOCIATED WITH A VEHICLE AND HAVING A SPELLING SYSTEM WITH A COMPLETION INDICATION

The present invention relates to a vehicle-associated device with a speller.

In modern vehicles (motor vehicles), there are often a number of devices wherein and/or for which user inputs can be carried out. Here, not only can the devices be activated or deactivated, i.e., switched on and switched off, but it is also often possible to carry out adjustments, to make selections or to perform inputs.

Examples of such devices in vehicles are a satellite-assisted navigation system, a multimedia installation, a car phone system, or a device for Internet access that is integrated in a vehicle.

The user inputs for such devices can occur in various manners, wherein, today, entries made by means of a turn/push knob, joysticks or one or more keys probably represent the most commonly used procedure. In addition, other input possibilities are known, such as, for example, using a touchpad or touch-sensitive display unit (monitor) or by voice input. In all cases, a display of the adjustments/selections/inputs that have been made can occur on a display unit (monitor, head up display).

In the case of the above-mentioned devices, for operation, a series of characters (letters, numbers, spaces, etc.) and/or symbols can or must be selected or entered, for example, in the case of a destination input for a satellite-assisted navigation system, in the case of entering a new contact person in or in selecting a known contact person from the storage device of a car phone system, in the case of operation of a device for mobile Internet access, etc.

Here, a rapid, simple and convenient selection and entry of characters and/or symbols is desirable, and even highly desirable with a view to achieving the least possible distraction from road traffic.

It is known that it is possible to provide a user with a means for facilitating and/or accelerating the input/selection by offering and/or displaying to the user, after the input/selection of at least one character/symbol, a completion of the already entered/selected characters/symbols, wherein the suggestions for a completion are selected on the basis of predeterminable criteria from data stored in a storage device. Here, in its simplest form, the data are compared with the characters/symbols entered/selected so far, and only those data which contain the entered/selected characters/symbols in the same order are supplied.

From DE 100 25 042 A 1, a device for entering names into a navigation system is known. The device comprises a storage device for storing the names of at least one category of location information, an input unit for selecting a name, a display unit for supporting the input, and a control unit which, depending on a predetermined sorting criterion for the stored names of a category and depending on earlier entries for the selection of the name to be entered, prompts the representation of a selectable name as a suggestion on the display unit. In the control unit, the selection probability of the names is used as a sorting criterion, and at least one statistically determined piece of information or piece of information determined by measurement technology regarding the local circumstances of the region designated by the name is used as a measure for the selection probability.

EP 1 455 163 A2 describes a method for structuring destination objects in a database, wherein, using an assignment function, the destination objects are assigned to a class in which similar destination objects are assembled. A database structure in which, depending on similarity criteria that can be established, destination objects that are similar to one another are assembled in a class, can be used particularly for entering a destination in navigation systems.

EP 1 359 393 A2 describes a vehicle navigation system with a computing unit which is connected to an input unit and to a display unit as well as to a storage element which contains a database with location and/or street names, wherein characters for entering by means of characters a location or street name and also selection suggestions for a location or street name are displayed on the display unit, and wherein the selection suggestions contain a character sequence that has already been entered by means of characters as a starting component. The displayed selection suggestions are selected from the location and/or street names of the database in such a manner that they differ as to the character following the already indicated character sequence. Moreover, EP 1 359 393 A2 describes a method for selecting a designation which is particularly suitable for use in navigation systems and mobile telephones.

DE 10 2005 062 465 A1 relates to a method for selecting a location, wherein, in a display for selecting locations, a first list and a second list of locations for the selection of the location from one of the lists are represented, wherein the respective basic sets of locations from which the respective entries of the lists are determined differ from one another. The start of the names of the locations in the two lists represented is in each case in agreement with the identical previously entered string of characters.

EP 2 075 547 A2 describes a method and a system for identifying a destination desired by a user in a navigation system. The invention comprises the steps of storing potentially desired destination names in a database, providing an on-board data input device with data input keys for a user, receiving sequential characters of a first section of the destination desired by the user from the data input device, identifying potentially desired location names on the basis of the sequential characters received from the data input device, identifying invalid entries that do not correspond to characters of a remaining portion of the potentially desired destination names, and deactivating the invalid characters on the data input device so that they cannot be selected by the user.

And DE 10 2009 021 124 A1 relates to an operating system for a vehicle with an input unit, an output unit and a speller function, by means of which, using characters, information can be entered into the operating system, and, in the case of agreement with a first character of a list entry—stored in the operating system—of an information or entertainment application, or with the initial string of characters of such a list entry, the entered character or the entered string of characters is completed or partially completed in accordance with the list entry, and is visually output via the output unit. In the case of completion or partial completion of an entered character or of an entered string of characters with respect to a list entry, an acoustic response occurs in addition to the visual display of the completed string of characters.

The aim of the present invention is to provide a device which allows a user to simply and rapidly transfer into an input field a completion of characters and/or symbols provided by a device.

This aim is achieved by the device according to claim 1. Advantageous variants of the invention are the subject matter of the dependent claims and result from the description as well as the appended figures.

According to the invention, a vehicle-associated device is proposed, which comprises an operating unit by means of which at least alphanumerical characters and/or symbols can be selected and assembled to form a character or function group, and a display device by means of which, using a display unit (for example, a monitor, head up display), selectable characters and/or symbols can be displayed in at least one selection field, and selected characters, symbols, character or function groups can be displayed in at least one input field. Moreover, the device comprises a storage device with data stored therein, and a data processing unit with which data can be selected from the data stored in the storage device, on the basis of predeterminable criteria and taking into consideration the characters and/or symbols selected so far by a user.

The device is characterized in that it is set up in order to display on the display unit a completion designation in the area of the selection field in the immediate vicinity of a character or symbol selected most recently by a user, to the extent that, by means of the data processing unit, a possible completion of the character(s) and/or symbol(s) selected so far is determined on the basis of the data in the storage device and taking into consideration the character(s) and/or symbol(s) selected by the user so far; the completion designation can be selected by a user using the operating unit, or a selection designation can be positioned automatically on the completion designation; and a displayed completion suggestion can be selected by a user using the operating unit.

By means of the display of a completion designation in the area of the selection field in the immediate vicinity, for example, immediately next to, above or below a character or symbol selected most recently by a user, the user receives, on the one hand, exactly in the area of the display unit that he happens to be looking at, an indication that a completion of the character(s) and/or symbol(s) selected so far is offered by the device. Due to the spatial proximity of this display to the character or symbol selected most recently, an operator action that may be required for selecting the completion designation is greatly facilitated and such a selection can occur rapidly and simply.

As a result, the time and attention that a user needs for entering in the device can be shortened advantageously, which is highly desirable also from the viewpoint of safety in the sense of producing the least possible distraction of a user from road traffic ("driver distraction").

According to a first advantageous variant of the invention, the device is set up in order to display the completion designation immediately to the right or immediately to the left next to the character or symbol selected most recently by a user.

According to a second advantageous variant of the invention, the device is set up so that, in the case where the completion designation is selected by a user using the operating unit or a selection designation is automatically positioned on the completion designation, in addition to the completion designation and/or the selection designation, at least one completion suggestion is automatically displayed in the area of the input field, wherein, optionally, an additional graphic element is displayed, which extends from the area of the displayed completion designation and/or of the selection designation to the area of the completion suggestion.

According to a third advantageous variant of the invention, the device is also set up in order to display, in the area of the selection field, a deletion designation in the immediate vicinity of the character or symbol selected most recently by a user. Here, the device according to the invention can be set up in order to display, in the area of the selection field, a completion designation immediately to the right next to the character or symbol selected most recently by a user, and a deletion designation immediately to the left next to the character or symbol selected most recently by a user.

Moreover, the device according to the invention can be set up in order to display the completion designation and/or the selection designation in the form of a cursor, a horizontal line, a marking and/or framing.

Additional advantages result if the device is set up in order to display selectable characters and/or symbols in the at least one selection field in a single-row, linear arrangement using the display unit. Similarly, it is advantageous if the device is set up in order to assemble certain characters and/or symbols in the form of at least one group and in order to display at least one group in the selection field in the form of a group symbol.

The operating unit of the device according to the invention can comprise at least one turn-push knob, joystick, touchpad, touch-sensitive display unit and/or device for voice input and voice recognition.

The invention can also comprise a smart speller by means of which a selected character and/or symbol or a sequence of selected characters and/or symbols can be compared with data stored in the storage device, and the device is set up in order to display, in the at least one selection field, only those characters and/or symbols which are eligible as next character and/or symbol on the basis of the selected character(s) or symbol(s) and on the basis of the data present in the storage device.

The present invention is explained in further detail in reference to the appended drawings.

Figure 2:
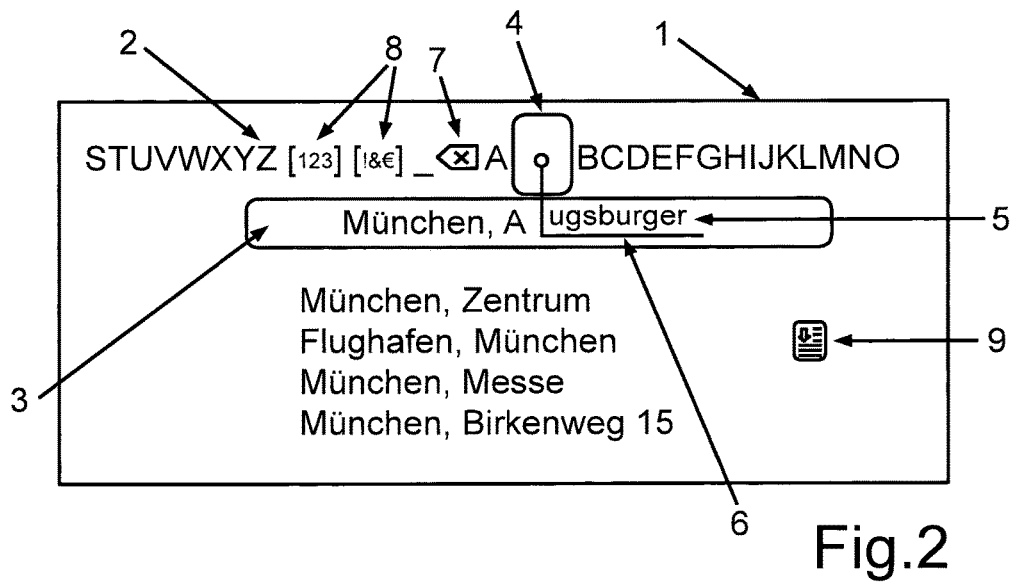

FIG. 1: a first example of a display on the display unit of the device according to the invention;

FIG. 2: a second example of a display on the display unit of the device according to the invention.

The representations in the figures are purely diagrammatic and not true to scale. Identical or similar elements are provided with identical reference numerals within the figures.

The embodiment examples explained below represent preferred embodiments of the present invention. The present invention is of course not limited to these embodiments.

As shown in FIGS. 1 and 2, the device comprises a display unit 1. On the display unit 1, selectable characters and/or symbols can be displayed in at least one selection field 2, and selected characters, symbols, a character or function group can be displayed in at least one input field 3. By means of an operating unit (not shown in the figures), characters (letters, numbers, space) and symbols (percent sign, paragraph sign, at sign, etc.) in the selection field 2 can be dialed in and subsequently deleted. Selected characters, symbols, a character and/or function group can be displayed in the at least one input field 3.

The arrangement of the display of the characters and symbols in the selection field 2 is not particularly limited and any suitable arrangement can be selected. It is preferable for the characters and symbols to be displayed in a single-row, rectilinear arrangement on the display unit 1, as represented in FIGS. 1 and 2.

By activating the operating unit, for example, by turning a turn-push knob, by a swiping movement on a touchpad or on a touch-sensitive monitor, characters and symbols can be dialed in from the selection field 2 for a selection and transferred into the input field 3. By means of an additional operator action, a dialed in character or symbol can be selected and subsequently displayed in the input field 3. The dialing in and selecting of a character or a symbol can obviously also occur by means of a single operator action, for example, if the character or symbol to be selected is already displayed in a selection designation, or if, for example, a dialing in and selecting of a character or symbol can occur by applying pressure to a touch-sensitive monitor.

According to the invention it is provided that the device is set up in order to display, on the display unit 1, a completion designation 4, in the area of the selection field 2, in the immediate vicinity of a character or symbol that has been entered or selected most recently by a user, to the extent that a possible completion of the character(s) and/or symbol(s) selected so far is determined by the data processing unit on the basis of the data in the storage device taking into consideration the characters and/or symbols selected by a user so far.

The data present in the storage device according to the invention can be, for example, location information (locations, streets/plazas, house numbers, company names, points of interest, etc.) for a satellite-assisted navigation system, contact data (last names, first names, telephone numbers, email addresses, birth dates, etc.) of a telephone device, data pertaining to multimedia data stored in a multimedia system, etc. The above list should not be understood to be definitive, and the data in the storage device can include all data that can be selected by means of a device according to the invention.

The criteria based on which the data processing unit determines whether or not a possible completion of the character(s) and/or symbol(s) selected so far is available are not particularly limited and any conceivable and useful criteria can be used for this purpose. Some of the possible criteria are mentioned above in the section referencing the prior art.

If a completion designation 4 is displayed by the device, it can be selected by a user using an operating unit, or a selection designation can automatically be positioned on the completion designation 4.

If the user does not wish to take a completion of the character(s) and/or symbol(s) selected so far, or if he does not wish to take the displayed completion suggestion 5, he can obviously dial in and/or select, for example, additional characters or symbols using the operating unit. After every such process, the characters and/or symbols selected so far can then be compared by the data processing unit with the data present in the storage device. If this comparison again results in a possible completion, then a completion designation 4 is again displayed by the device in the immediate vicinity of the character or symbol selected most recently by the user.

In FIGS. 1 and 2, a situation is represented in which the completion designation 4 has been dialed in by a user or a selection designation has been positioned automatically on the completion designation 4.

According to the invention, the selection designation and/or the completion designation 4 can optionally be displayed in the same manner, for example, in the form of a cursor, a horizontal line, a marking and/or framing. As desired, the size and/or the color used to display the selection designation and the completion designation 4 can be different. By means of a difference in the representation of selection designation and completion designation 4, it is, for example, easier for a user to see whether or not a completion designation 4 has been dialed in.

In the examples represented in FIGS. 1 and 2, the completion designation 4 is displayed immediately to the right next to the character (here: A) selected most recently by a user. However, this is not necessarily the case, and the completion designation 4 can also be displayed immediately to the left of, immediately above or immediately beneath a character or symbol selected most recently by a user.

In the case of texts that are written from left to right, it will make sense to display the completion designation 4 immediately to the right next to a character or symbol selected most recently by a user, since this position corresponds to the "direction of writing." In the case of texts that are written from right to left, it will make sense accordingly to display the completion designation 4 immediately to the left next to a character or symbol selected most recently by a user.

As also represented in FIGS. 1 and 2, to the extent that the completion designation 4 was selected by a user using the operating unit, or to the extent that the selection designation was positioned automatically on the completion designation 4, a completion suggestion 5 can be displayed automatically in the input field 3, in addition to the completion designation 4 and/or the selection designation.

In the examples represented in FIGS. 1 and 2, the suggested completion consists of the string of characters "ugsburg." An acceptance of the suggested completion would thus complete the already selected character "A" to form the location name "Augsburg."

Furthermore, it is optionally possible according to the invention that a graphic element 6 is displayed, which extends from the area of the displayed selection designation or completion designation 4 to the area of the completion suggestion 5. In the example shown in FIGS. 1 and 2, this graphic element is a small circle with an adjoining line that extends first vertically downward and to the left next to the suggested completion and then beneath the suggested completion to the right.

This graphic element 6 is to be used in order to create a "visual" connection between the displayed selection designation or completion designation 4 and a suggested completion, along which the gaze of a user is guided advantageously from the displayed selection designation or completion designation 4 to the suggested completion.

In a preferred manner, a displayed completion suggestion 5 comprises only a few selectable elements, preferably not more than three, even more preferably not more than two, and particularly preferably only one element. As a result the time that a user needs for recognizing and selecting a suggested element is reduced advantageously to a minimum. An example in which the completion suggestion comprises only one element is represented in FIGS. 1 and 2.

For the case where, for example, more than two or three suggestions for a completion are determined by the data processing unit, this can be shown by the display of a selection list designation 9, wherein, after the dialing in and selecting of this selection list designation 9, a selection list can be displayed. An example of this is represented in FIG. 2.

As also represented in FIG. 2, it is also possible, according to the invention, to display, as desired, in the area of the selection field 2, a deletion designation 7 in the immediate vicinity of the character or symbol selected most recently by a user. With regard to the deletion designation 7 as well, its positioning is advantageously selected in a manner corresponding to the direction of writing. Thus, in the case of a text that is written from left to right, it is preferable that, in the area of the selection field 2, a completion designation 4 be displayed immediately to the right next to the character or symbol selected most recently by a user, and that a deletion designation 7 be displayed immediately to the left next to the character or symbol selected most recently by a user.

To the extent that in the present application the terms "in the immediate vicinity" or "immediately to the left," "immediately to the right," "immediately above" or "immediately beneath" are used, they are understood to mean that, between the most recently selected character or symbol and a completion designation 4 and/or a deletion designation 7, either no other elements are displayed or only a very few graphic elements are displayed, which are used for better identification of a selected character or symbol, the completion designation 4, the deletion designation 7 and/or the correlation between a selected character or symbol and the completion designation 4.

Moreover, the device according to the invention can be set up in order to display, in the case of a letter/character selected using the operating unit and displayed in/with a selection designation, that there is at least one variant with a diacritical mark for the letter/character.

If, for example, on the basis of the language selected for the device, there are, for a letter (for example, A), an umlaut (for example, Ä) and variants using an accent (for example, Á and À), then this circumstance can be displayed according to the invention, for example, by a display of the variants that is reduced in size in comparison to the selected letter/character, above the letter/character. However, the manner of displaying the fact that variants exist for the letter/character is not limited to this type of display and it can be of any other suitable type.

For example, the variants can be retrieved by way of a special manner of operating the operating unit and subsequently at least one of the variants can be selected.

For example, in the case of a letter for which at least one variant with a diacritical mark exists, the character expansion can be activated by a long push/long press on the letter within the character/symbol band. The display of the character/symbol band is then expanded with the respective characters associated with the letter. After the selection of any of these characters, for example, by another long push/long press on the character, the display of the character/symbol band is again reduced to the basic characters.

In many cases there is not enough space available on the display unit 1 for a sufficiently large display of all the characters and/or symbols, so that a selection requires a "scrolling in" of characters and/or symbols not displayed initially on the display unit 1 and a "scrolling out" of characters and/or symbols displayed initially on the display unit 1 (for example, an expandable character/symbol band).

Here, the character/symbol band can have a beginning stop position and an end stop position, for example, a beginning stop position at the letter "A" and an end stop position at the number "9." In order to be able to move from such a beginning or end stop position in a time-saving manner to the respective other end of the character/symbol band, a cursor jump can be provided. If one scrolls to the respective beginning or the end of the character/symbol band, for example, the cursor is briefly caught and stopped; after scrolling again in the same direction as before, the cursor can then be animated out of the visible area, for example, by a "wrap around animation," and be displayed again on the other side of the character/symbol band.

In many cases scrolling in and scrolling out can be reduced or even avoided if certain characters and/or symbols are assembled in the form of at least one group and each group is displayed by means of a group symbol 8 in the selection field 2.

As shown in FIG. 2, a first group can comprise, for example, the numbers 0 to 9, and a second group can comprise a number of symbols (!, &, €, %, §, *, etc.). A suitable group symbol 8 should be selected for the display of a group, i.e., a display by means of which it is as easy as possible for a user to recognize which elements are contained in the group (in the example depicted in FIG. 2 "[123]" for the group of the numbers 0 to 9, and "[!&€]" for the group of the symbols that can be dialed in and selected). A group can also be retrieved by way of a special manner of operating the operating unit, and subsequently at least one element of the group can be selected. In this regard, it is possible to provide, for example, the same operator actions as were described above in reference to the character expansion based on diacritical marks.

The operating unit provided in the case of the device according to the invention is not particularly limited, and any suitable operating unit can be provided. The operating unit comprises, for example, at least one turn/push knob, joystick, touchpad, touch-sensitive display unit and/or device for voice input and voice recognition. One or more identical operating units or a combination of different operating units can be provided at the same time. If the operating unit is a touch-sensitive display unit, the operating unit and display unit 1 of the device can be identical.

As a preferred example of an operating unit of the device according to the invention, a turn/push knob is mentioned, which can be turned and actuated about at least one rotation axis. By turning such a turn/push knob, it is possible to dial in, for example, a character, a symbol or a group, and by applying pressure to the turn/push knob, the dialed in character or symbol can be selected or the group can be opened (expanded). In the same way, for example, a deletion designation 7 can be dialed in and selected.

The operating possibilities of a turn/push knob are further expanded if the latter can be moved and actuated in at least one direction perpendicular to the rotation axis. Such an operating unit is often referred to as a joystick. The resulting additional operating possibilities can be used advantageously, for example, for dialing in and selecting a selection list designation 9 and allowing access to a selection list. A possible display of a selection list designation 9 and of a selection list (or of a section thereof), as can also be displayed by the device according to the invention, is represented in FIG. 2.

The device according to the invention can also comprise a so-called "smart speller." By means of such a "smart speller," a selected character or symbol or a sequence of selected characters and/or symbols can be compared with data stored in storage device, and it is possible to display only those characters and/or symbols in the at least one selection field 2 which are eligible as the next character and/or symbol, based on the selected character(s) or symbol(s), and on the data present in the storage device.

Here, at least one selection criterion can be provided for the "eligibility", for example, that an agreement must exist between the selected character or symbol or a sequence of selected characters and/or symbols and a character or symbol or a sequence of characters and/or symbols within at least one data element among the data present in the storage device. For example, if such an agreement exists with regard to several data elements (for example, location names, street names, first names, last names, telephone numbers, email addresses, etc.), then the smart speller displays only the characters and/or symbols in the selection field that are required to complete the data elements which are eligible.

As a result, it is made easier for the user to select the next character(s) or symbol(s) and the risk of an incorrect dial in and/or an incorrect selection is reduced.

On the display unit 1 of the device according to the invention, additional elements can naturally be displayed, such as, for example, an instruction or assistance text, an icon which, when selected, makes it possible to configure options of the device, the elements, already been mentioned above, of a selection list that is available and/or a selection list designation 9 (list selection switch area), etc., as shown partially in FIG. 2. These elements can also be activated by corresponding operator actions.

Moreover, it also is possible to provide that, after the selection of a character or symbol, a deletion switch area 7 is displayed immediately adjacently to a selection designation, area which can be actuated by the operating unit for the deletion of at least the most recently selected character or symbol displayed in an input field.

"Immediately adjacently" is understood to mean that no additional character or symbol is displayed between the deletion switch area 7 and the selection designation. The deletion switch area 7 can, in principle, be displayed in any suitable position immediately adjacently to the selection designation, that is to say, for example, immediately to the left of, to the right of, above or beneath the selection designation.

The examples represented in FIGS. 1 and 2 relate to a navigation system. The present invention is naturally not limited to the use in a navigation system but can instead be used for all types of vehicle-associated devices in which the dialing in and selecting of characters and/or symbols occurs or can occur, such as, for example, a multimedia installation, a car phone system or a vehicle-integrated device for Internet access.

Since it is known to a person skilled in the art how the device according to the invention, the display device with the display unit 1 (monitor, head up display) can be constructed, and how the components of the device must interact with one another so that the device according to the invention has the properties described in the present application, no further details in that regard are needed in the present case.

By means of the display of the completion designation 4 in the immediate vicinity of a character or symbol entered or selected most recently by a user, a user of the device according to the invention is provided ready access to an optimal possibility for selecting a completion offered by the device for at least one already selected character or symbol, and for transferring the completion into an input field 3.

This results in an optimal support for the user. In addition, the duration and the attention that a user needs for the selection/input process are reduced, as a result of which undesired distraction of the driver from road traffic, in the sense of traffic safety, is minimized.

The invention claimed is:

1. A vehicle-associated device comprising:
an operating unit integrated into a vehicle configured such that at least alphanumerical characters or symbols can be highlighted and selected to form a character or function group;
a display device configured such that, using a display unit, selectable characters or symbols can be displayed in at least one selection field, and selected characters, symbols, a character group or function group can be displayed in at least one input field;
a storage device comprising data stored therein, and
a data processing unit for selecting data from data stored in the storage device, on the basis of predeterminable criteria and taking into consideration any characters or symbols selected so far by a user,
wherein the vehicle associated device is configured to:
display, on the display unit, the selection field comprising a single row of selectable characters and symbols;
receive one or more user actions highlighting a first selectable character;
receive a first user action from the operating unit selecting the first selectable character;
in response to receiving the first user action selecting the first selectable character, displaying the first selected character in the input field;
receive a second user action highlighting a second selectable character;
in response to a determination that at least one completion suggestion is available based on both the characters and symbols displayed on the input field and the highlighted second selectable character:
display a completion designation as one or more of a cursor, a horizontal line, a marking or a framing, wherein the completion designation is displayed in the area of the selection field in the immediate vicinity of the highlighted second selectable character,
receive a third user action from the operating unit selecting the completion designation;
in response to receiving the third user action selecting the completion designation using the operating unit:
display the completion suggestion in the input field in a position immediately following the characters and symbols already displayed on the input field;
wherein the completion suggestion is displayed with an additional graphic element visually connecting the completion designation in the selection field with the completion suggestion in the input field, wherein the additional graphical element comprises a graphical element extending from the completion designation to the completion suggestion; and
in response to a third highlighted character or symbol by the user in the selection field, display the completion designation in the immediate vicinity of the third highlighted character or symbol.

2. The device according to claim 1, characterized in that the device is further configured to display the completion designation immediately to the right or immediately to the left next to a character or symbol highlighted most recently by the user.

3. The device according to claim 1, characterized in that the device is further configured to display, in the area of the selection field, a deletion designation in the immediate vicinity of a character or symbol highlighted most recently by the user.

4. The device according to claim 3, characterized in that the device is further configured to display, in the area of the selection field, a completion designation immediately to the right next to the character or symbol highlighted most recently by the user and a deletion designation immediately to the left next to the character or symbol highlighted most recently by the user.

5. The device according to claim 1, characterized in that the device is further configured to display a selection designation in the form of a cursor, a horizontal line, a marking or framing.

6. The device according to claim 1, characterized in that the device is further configured to assemble certain characters or symbols in the form of at least one group and in order to display the at least one group in the selection field in the form of a group symbol.

7. The device according to claim 1, characterized in that the operating unit comprises at least one turn/push knob, joystick, touchpad, touch-sensitive display unit or device for voice input and voice recognition.

8. The device according to claim 1, characterized in that it comprises a smart speller configured such that a selected character or symbol or sequence of selected characters or symbols can be compared with data stored in the storage device, and the device is further configured to display, in the selection field, only those characters or symbols which are eligible as next character or symbol on the basis of the selected character(s) or symbol(s) and on the basis of the data present in the storage device.

9. The device according to claim 1, wherein a selection designation and the selection field are positioned in a linear arrangement.

10. The device according to claim 1, wherein the completion designation comprises a user interface element positioned adjacent to a most recently selected character or symbol of the selection field.

11. The device according to claim 10, wherein the completion designation is positioned, at least in part, in a linear arrangement with the symbols or characters of the selection field.

* * * * *